United States Patent
Jüling et al.

[19]

[11] Patent Number: 6,135,690
[45] Date of Patent: Oct. 24, 2000

[54] CONNECTING DEVICE INCLUDING GUIDE SLEEVE WITH EXPANDABLE COLLAR

[75] Inventors: Dieter Jüling, Schmitten; Jochen Stölken, Hofheim, both of Germany

[73] Assignee: Fairchild Fasteners Europe - Camloc GmbH, Kelkheim, Germany

[21] Appl. No.: 09/116,765

[22] Filed: Jul. 17, 1998

[30] Foreign Application Priority Data

Jul. 18, 1997 [DE] Germany ............................ 197 31 038

[51] Int. Cl.$^7$ .............................. F16B 21/18; F16B 39/00
[52] U.S. Cl. ........................... 411/353; 411/105; 411/999; 411/501
[58] Field of Search ................................... 411/103, 105, 411/108, 109, 352, 353, 999, 501

[56] References Cited

U.S. PATENT DOCUMENTS

| | | | |
|---|---|---|---|
| 4,324,517 | 4/1982 | Dey | ...................................... 411/105 X |
| 4,735,536 | 4/1988 | Duran | ...................................... 411/353 |
| 4,815,908 | 3/1989 | Duran et al. . | |
| 4,884,930 | 12/1989 | Döbbeler . | |
| 4,906,153 | 3/1990 | Duran | ...................................... 411/353 |
| 5,006,025 | 4/1991 | Duran . | |
| 5,195,858 | 3/1993 | Döbbeler . | |

FOREIGN PATENT DOCUMENTS

| | | |
|---|---|---|
| 0 480 866 | 4/1992 | European Pat. Off. . |
| 2 142 488 | 3/1972 | Germany . |
| 2 243 661 | 7/1973 | Germany . |
| 37 34 735 | 4/1988 | Germany . |
| 37 29 423 | 3/1989 | Germany . |
| 40 39 472 | 6/1991 | Germany . |
| 40 32 594 | 4/1992 | Germany . |
| 196 08 948 | 9/1997 | Germany . |
| 1 301 520 | 12/1972 | United Kingdom . |

*Primary Examiner*—Neill Wilson
*Attorney, Agent, or Firm*—Wenderoth, Lind & Ponack, L.L.P.

[57] ABSTRACT

A closure device for connecting two members which for example have at least in regions the form of plates, includes a closure pin which can be secured, if necessary, loss-proof on the first member and a receiving element which can be disposed on the back side of the second member. The closure pin has a head section for bracing on the front side of the first member and a shaft section which can be guided through an opening of a guidance sleeve disposed in an opening of the first member. The shaft section has threads cooperating with counterthreads of a connecting section of the receiving element. The guidance sleeve on the end associated with the heat section of the closure pin includes a radially expanded head section and at the end facing away from the head section of the closure pin a radially expandible collar-like securing section which is bent round-about outwardly. The guidance sleeve encompasses the shaft section of the closure pin in the region of a shearing gap between the first member and the second member free of play, or substantially free of play.

50 Claims, 1 Drawing Sheet

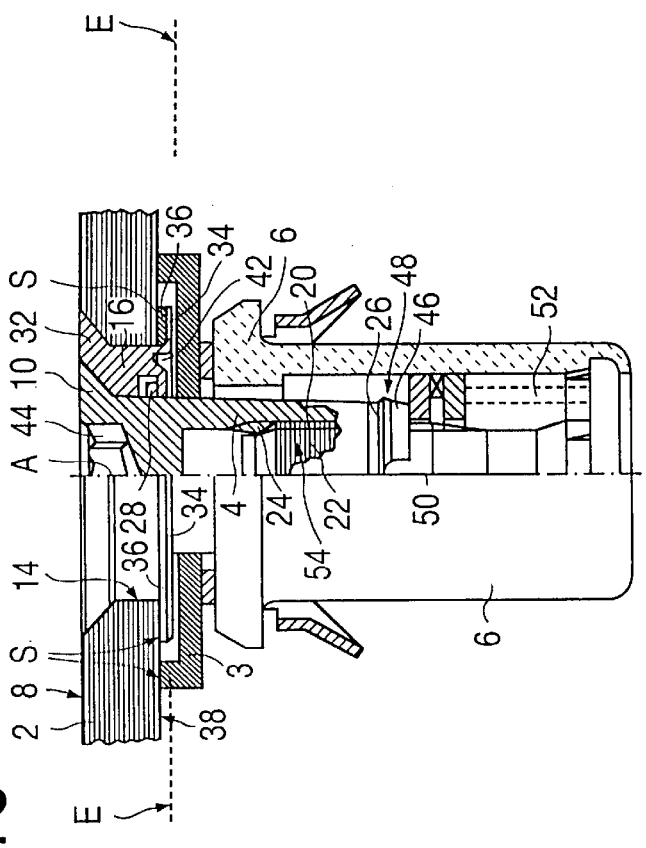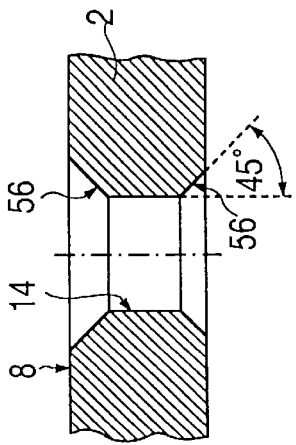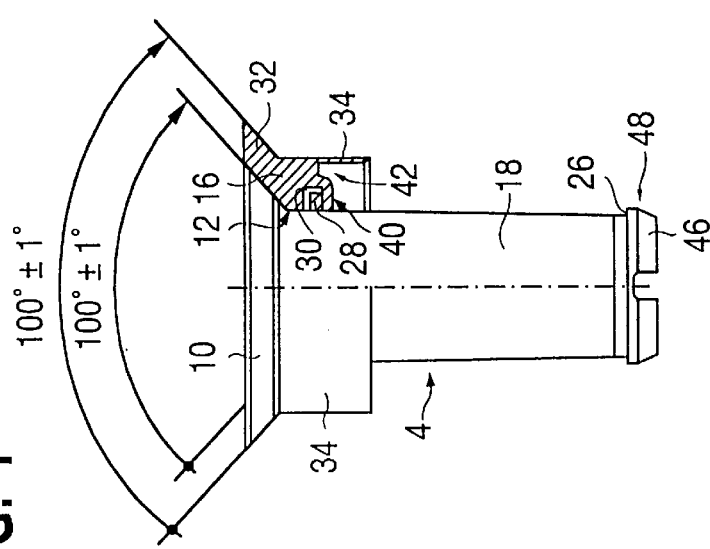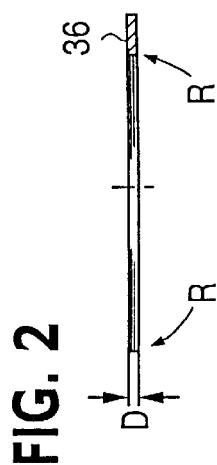

CONNECTING DEVICE INCLUDING GUIDE SLEEVE WITH EXPANDABLE COLLAR

BACKGROUND OF THE INVENTION

The invention relates to a closure device for connecting two members which have, for example, at least in regions, the form of a plate, with a closure pin which can be secured on the first member, if necessary such that it cannot be lost, and a receiving element which can be disposed on the back side of the second member, in which the closure pin comprises a head section implemented for the support on the front side of the first member and a shaft section which can be passed through an opening of a guide sleeve disposed in an opening of the first member, which shaft section comprises threads cooperating with counterthreads of a connecting section of the receiving element, in which the guide sleeve comprises on the end associated with the head section of the closure pin a radially expanded head section and at the end facing away from the head section of the closure pin a fastening section which can be radially expanded in the manner of a collar.

Such closure devices, as they are known for example from DE 40 32 594 C2, serve inter alia as cover closures in aircraft construction. The panels or similar members in which such closure devices with their guidance sleeves are to be retained, comprise for example carbon fibers or similar composite materials having low load-bearing capacity, which makes problematic securing the closure device in particular in the case of relatively thin members due to the acting shearing forces.

SUMMARY OF THE INVENTION

It is the task of the present invention to improve a closure device of the known type such that, at minimum structural height and smallest possible outer diameter, the fatigue life of its mounting in the first member is significantly increased under shearing stress.

This task is solved according to the invention in simple manner in a closure device of the above cited type for example thereby that the guidance sleeve in the region of the shearing gap between the first member and the second member encompasses the shaft section of the closure pin free of play, or substantially free of play.

It has surprisingly been found that in realizing these characteristics the service life of the securing of the closure device under shearing stress can be nearly doubled relative to the known closure devices in spite of lower structural height and smaller outer diameter.

The shearing strength can still be further improved if according to a special embodiment of the invention between the back-side front face of the guidance sleeve and the securing section an annular recess is provided. In this way it is possible, which is of particular interest when using fiber composite materials with high tolerances in the thickness, to compensate considerable tolerances and specifically without impairing the flanging ability of the securing section and even at small thicknesses of the first member. After it has been bent by means of for example a tool, the collar-like securing section does not project at all radially outwardly beyond the solid material region of the guidance sleeve on the back side of the first member or projects only insignificantly.

It is therein of particular advantage that, if the closure pin is implemented in a manner known per se as a hollow pin, the shaft section is implemented, at least in the region of the shearing gap, as a solid shaft. In this way, through a bearing portion of maximum size of the cylinder contour of the closure pin the transfer of highest possible shearing forces is realized. By matching the driving depth to the depth of the thread bore at maximum requirement of the driving cycle and maximum requirement of the thread overlap at minimum plate thickness, maximum shearing stress can be ensured. The closure element thus assumes as a structural closure element within airplane construction functions determining fabrication.

A still further improvement of the functional capability of the closure device is obtained if the securing section is bent off outwardly onto a washer resting on the edge, encompassing the guidance sleeve, of the back side of the first member wherein the washer is implemented as a flat annular disk substantially rectangular in cross section and encompasses the guidance sleeve free of play, or substantially free of play. The flat washer ensures the distribution of the flanging forces such that the load per unit area of the material of the first member is limited in the region of the edge encompassing its opening which is in particular of special advantage in the case of the frequently used carbon fiber materials which has a tendency to delaminate, and specifically at an increase of the transferability of shearing forces and low structural height.

A yet further augmentation of the shearing strength can be attained thereby that the securing section is bent radially outwardly in a plane perpendicular to the axis of the guidance sleeve and is fully in contact on the flat washer in the plane extending perpendicularly to the axis of the guidance sleeve. Due to the flanging of the securing section by 90° a minimum distance between the first and the second member can be maintained.

In order to attain the flattest possible flanging of the securing section without damaging it, the washer can be provided with a radius on its rearward inner edge, thus at that edge about which the securing section is flanged outwardly. This also prevents the securing section from a springing back.

If the first member comprises a relatively strong material such as aluminum, the use of a washer, such as is for example of advantage for fiber composite materials, is not absolutely necessary. In this case the securing section can be flanged outwardly by an angle of more than 90° into a countersink in the edge encompassing the guidance sleeve of the back side of the first member in order to support hereby even more the transferability of shearing forces.

Especially advantageous conditions with respect to low structural height and transferability of shearing forces exist if the rearward face of the securing section bent in the outward direction is aligned, or is substantially aligned, with the rearward front face of the guidance sleeve.

The securing section has usefully a wall thickness between 0.1 and 0.3 mm, preferably of approximately 0.2 mm.

The washer should have a material thickness between 0.2 and 0.5 mm, preferably of approximately 0.35 mm.

The simple centering of closure pin and/or guidance sleeve is obtained if the head section of the closure pin and/or the head section of the guidance sleeve is/are implemented as a countersunk head, conical on the outside, with the opening in the first member and/or the opening in the guidance sleeve comprising at the front side a corresponding conical countersink.

The conical angle of the countersunk head of the closure pin and/or of the guidance sleeve are therein preferably between 90 and 110°, in particular approximately 100°.

In a further embodiment of the invention the closure pin comprises on its circumferential surface a stop face facing the head section, which, in order to prevent the complete pulling of the closure pin from the opening of the guidance sleeve, cooperates with a locking ring which is disposed in a recess, resembling an annular groove, open toward the opening of the guidance sleeve. The closure pin is thus retained loss-proof in the guidance sleeve after the assembly of the closure device.

The locking ring is therein preferably prestressed radially inwardly such that when the closure pin is displaced axially it retains its prestress and thus the closure pin remains at rest in any position, but, on the other hand, can also not be pulled out of the guidance sleeve even when high forces are exerted.

But with the aid of the described loss proofing it is also possible to implement the closure pin and the guidance sleeve as preassembled structural unit and to set it as such into the opening of the first member before the flanging of the securing section. This takes place for example thereby that the tool has a threaded stem which can be screwed into the inner threads of the hollow-cylinder portion of the closure pin, which subsequently serves for receiving a connecting section of the receiving element of the closure device.

BRIEF DESCRIPTION OF THE DRAWINGS

Further goals, characteristics, advantages and application feasibilities of the present invention are evident in the following description of embodiment examples in conjunction with the drawings. Therein all described and/or graphically represented characteristics form by themselves or in any combination the subject matter of the invention also independently of their combination in individual claims or their reference back. In the drawings:

FIG. 1 is a lateral view, partially sectioned of a guidance sleeve and closure pin of a closure device comprising the invention;

FIG. 2 is a partially sectioned side view of a washer for a closure device according to the invention;

FIG. 3 is a partially sectioned side view of a closure device comprising the invention in closed position on a first member; and FIG. 4 is a section of a first member in the region of the opening with a back-side countersink

DETAILED DESCRIPTION OF THE INVENTION

The closure device depicted in the drawings comprises substantially a closure pin 4 securable on the first member 2 such that it is loss-proof, and a receiving element 6 which can be disposed in the manner of a casing on the back side of the second member 3 implemented in this case frame-like, which [receiving element] by means of a cage 7 can be mounted on the back side of the second member 3. The closure pin 4 comprises a head section 10 for bracing on the front side 8 of the first member 2 as a countersunk head, which fits into a corresponding countersink of a guide sleeve 16, as well as a shaft section 18 which can be guided through an opening 12 of the guidance sleeve 16.

The guidance sleeve 16 is inserted into an opening 14 of the first member 2 and comprises also a head section 32 implemented as a conical countersunk head, which fits into a corresponding front-side countersink in the edge of the opening 14 of the first member 2.

The shaft section 18 of the closure pin 4 is partially formed by a hollow cylinder having a threaded bore 54 with threads 24 which cooperate with outer counterthreads 20 of a connection section 22 of the receiving element 6. For actuation by means of a rotating tool the head section 10 of the closure pin 4 is equipped with a winged cross slot 44. When screwing the closure pin 4 to the receiving element 6 the shaft section 18 is braced with its back-side front face 50 on a spring assembly 52 in the receiving element 6.

The closure pin 4 can initially be inserted with its shaft section 18 into the opening 12 of the guidance sleeve 16 only until it comes to rest with a stop edge 48 provided with a chamfering 46 on a locking ring 28 provided is an annular groove-like recess 30 of opening 12 of the guidance sleeve 16 and implemented as an expansion ring with a flat cross section which is substantially rectangular. When the shaft section 18 is inserted further into the guidance sleeve 16 the locking ring 28 is expanded counter to its spring prestress directed inwardly and is therein pushed deeper in the outward direction into the recess 30 until the ridge-like stop edge 48 has slid past the locking ring 28. The spring prestress is dimensioned such that the closure pin 4 comes to a standstill in any axial position. On the side opposing the chamfering 46 the stop edge 48 comprises an annular stop face 26 which, when the closure pin 4 is pulled out of the guidance sleeve 16 abuts the locking ring 28. In this way the closure pin 4 is retained loss-proof on the first member 2. The loss-proofing can also serve for the purpose of setting the closure pin 4 and the guidance sleeve 16 as a preassembled structural unit into the opening 14 of the first member 2 before a securing section 34 provided on the back-side end of the guidance sleeve is flanged outwardly.

The guidance sleeve 16, as previously cited, has on its end facing away from the head section 10 of the closure pin 4 radially expandable collar-like securing section 34 of relatively small wall thickness, which initially is substantially cylindrical and during the assembly, if necessary by interspacing a washer disk 36, is bent off round-about toward the outward direction with the aid of a deformation tool. The flanging tool can therein engage with a threaded stem the inner threads 24 of the shaft section 18.

The guidance sleeve 16 comprises the shaft section 18 of the closure pin 4 in the region of shearing gap S between the first member 2 and the second member 3 free of play, or substantially free of play, and specifically in a region of the closure pin 4 otherwise implemented as a hollow pin, in which this [closure pin] is implemented between the winged cross slot 44 and the threaded bore 54 of the hollow-cylinder portion of the shaft section 18 as a solid shaft. Driving depth of the winged cross slot 44 and depth of the threaded bore 54 are matched at maximum requirement of the driving cycles and maximum requirement of the overlap of threads 24, 20 such that at minimum thickness of the first member 2 due to the remaining solid shaft section maximum shearing stress is ensured.

The guidance sleeve 16, which is slightly thicker than the first member 2, comprises between its back-side front face 40 and the securing section 34 an annular recess 42 such that the securing section 34, which is bent radially outwardly in a plane E perpendicularly to the axis A of the guidance sleeve 16, in spite of the form-fit overlapping of the washer disk 36 taking into consideration tolerances in the material thickness of the first member 2, does not significantly project beyond the front face 40 of the guidance sleeve 16.

The washer disk 36 is implemented as flat annular disk substantially rectangular in cross section and encompasses the guidance sleeve 16 free of play, or substantially free of play. The securing section 34 is in the plane E perpendicular to the axis A of the guidance sleeve 16 in full contact on the flat washer disk 36 such that excessive pressure forces on the edge of the first member 2 are avoided.

The securing section 34 can have a wall thickness between 0.1 and 3 mm, the washer disk 36 a material thickness D between 0.2 and 0.5 mm such that, on the one hand, it is ensured that the securing section 34 form-fittingly encompassing the washer disk 36, which on its back-side inner edge is rounded off with a radius R, can during the assembly be bent over outwardly by means of a tool, but, on the other hand, the required shearing and tensile strength is ensured.

If the first member 2 does not comprise a material which tends to delaminate but a strong material, such as aluminum, a washer disk 36 is indispensible. In this case the securing section 34 can be flanged outwardly at an angle of more than 90° into a countersink in the edge, encompassing the guidance sleeve 16, of the first member 2 in order to improve the absorption of shearing forces.

FIG. 4 illustrates a section of a first member 2 in the region of opening 14 which, in this case, also comprises a back-side countersink 56 within which the securing section 34 can be flanged by less than 90°. Such an embodiment is suitable for members 2 comprising a non-delaminating material such as aluminum.

What is claimed is:

1. A connecting device for connecting first and second members that are at least partially plate-shaped, said connecting device comprising:
    a guide sleeve to be inserted through an opening in the first member;
    a closure pin having a head section to be braced against a front side of the first member, and a shaft section extending from said head section and fitting through an opening in said guide sleeve, said shaft section having a threaded portion;
    a receiving element to be positioned at a back side of the second member and having a threaded portion to mesh with said threaded portion of said shaft section and to thereby connect the first and second members, whereby the thus connected first and second members are subject to shearing forces;
    said guide sleeve including at a first end thereof a radially expanded head abutting said head section of said closure pin, and said guide sleeve including at a second end thereof a collar-shaped securing section that is radially outwardly expandable;
    said guide sleeve surrounding said shaft section with substantially no play therebetween in a region at which the connected first and second members are subject to the shearing forces; and
    a washer to be positioned at a back side of the first member, said guide sleeve extending through said washer with substantially no play therebetween, said washer comprising a flat annular disk of substantially rectangular cross section, and said securing section when outwardly expanded contacting a side of said washer facing away from the first member.

2. A connecting device as claimed in claim 1, wherein said second end of said guide sleeve has a back face directed away from said head, and an annular recess between said back face and said securing section.

3. A connecting device as claimed in claim 2, wherein said securing section when expanded outwardly is substantially aligned with said back face.

4. A connecting device as claimed in claim 1, wherein said shaft section comprises a solid shaft portion in said region and a hollow shaft portion extending axially from said solid shaft portion.

5. A connecting device as claimed in claim 4, wherein said threaded portion of said shaft section comprises female threads formed internally of said hollow shaft portion, and said threaded portion of said receiving element comprises male threads of said receiving element.

6. A connecting device as claimed in claim 1, wherein said securing section contacts an inner edge of said washer.

7. A connecting device as claimed in claim 1, wherein said securing section is bent outwardly in a plane perpendicular to an axis of said guide sleeve and fully contacts said washer in said plane.

8. A connecting device as claimed in claim 1, wherein said washer has a radius between an inner edge and a back face thereof.

9. A connecting device as claimed in claim 1, wherein said washer has a thickness of from 0.02 to 0.5 mm.

10. A connecting device as claimed in claim 1, wherein said washer has a thickness of approximately 0.35 mm.

11. A connecting device as claimed in claim 1, wherein said securing section when expanded outwardly is substantially aligned with a back face of said guide sleeve.

12. A connecting device as claimed in claim 1, wherein said securing section when expanded outwardly is bent at an angle of less than 90° to thus fit in a countersink formed in the first member.

13. A connecting device as claimed in claim 1, wherein said securing section has a wall thickness of from 0.1 to 0.3 mm.

14. A connecting device as claimed in claim 1, wherein said securing section has a wall thickness of approximately 0.2 mm.

15. A connecting device as claimed in claim 1, wherein said head of said guide sleeve is conically tapered to fit in a countersink in the opening in the first member.

16. A connecting device as claimed in claim 15, wherein an angle of conical taper of said head is from 90° to 110°.

17. A connecting device as claimed in claim 16, wherein said angle is approximately 100°.

18. A connecting device as claimed in claim 15, wherein said head section of said closure pin in conically tapered and fits in a countersink in said head of said guide sleeve.

19. A connecting device as claimed in claim 18, wherein an angle of conical taper of said head section is from 90° to 110°.

20. A connecting device as claimed in claim 19, wherein said angle of conical taper of said head section is approximately 100°.

21. A connecting device as claimed in claim 1, wherein said head section of said closure pin in conically tapered and fits in a countersink in said head of said guide sleeve.

22. A connecting device as claimed in claim 21, wherein an angle of conical taper of said head section is from 90° to 110°.

23. A connecting device as claimed in claim 22, wherein said angle of conical taper of said head section is approximately 100°.

24. A connecting device as claimed in claim 1, wherein said shaft section has a stop face facing said head section, and said guide sleeve has a stop to abut said stop face to prevent removal of said closure pin from said guide sleeve.

25. A connecting device as claimed in claim 24, wherein said stop comprises a locking ring positioned in an annular recess in said guide sleeve.

26. A connecting device as claimed in claim 26, wherein said locking ring is prestressed radially inwardly, such that said locking ring grips said shaft section over an entire range of axial movement of said closure pin relative to said guide sleeve.

27. A connecting device as claimed in claim 25, wherein said stop face comprises an annular face at an end of said shaft section spaced from said head section.

28. A connecting device as claimed in claim 24, wherein said stop is positioned in a recess in said guide sleeve.

29. A connecting device as claimed in claim 28, wherein said stop is biased radially inwardly, such that said stop grips said shaft section over an entire range of axial movement of said closure pin relative to said guide sleeve.

30. A connecting device as claimed in claim 29, wherein said stop face comprises an annular face at an end of said shaft section spaced from said head section.

31. An assembly to be employed as part of a connecting device for connecting first and second members that are at least partially plate-shaped, said assembly comprising:
- a guide sleeve to be inserted through an opening in the first member;
- a closure pin having a head section to be braced against a front side of the first member, and a shaft section extending from said head section and fitting through an opening in said guide sleeve, said shaft section having a threaded portion;
- said guide sleeve including at a first end thereof a radially expanded head abutting said head section of said closure pin, and said guide sleeve including at a second end thereof a collar-shaped securing section that is radially outwardly expandable;
- said guide sleeve surrounding said shaft section with substantially no play therebetween in a region at which the first and second members when connected would be subject to shearing forces;
- said shaft section having a stop face facing said head section, and said guide sleeve having a stop abutting said stop face and preventing removal of said closure pin from said guide sleeve; and
- a washer to be positioned at a back side of the first member, said guide sleeve extending through said washer with substantially no play therebetween, said washer comprising a flat annular disk of substantially rectangular cross section, and said securing section when outwardly expanded contacting a side of said washer facing away from the first member.

32. An assembly as claimed in claim 31, wherein said second end of said guide sleeve has a back face directed away from said head, and an annular recess between said back face and said securing section.

33. An assembly as claimed in claim 31, wherein said shaft section comprises a solid shaft portion in said region and a hollow shaft portion extending axially from said solid shaft portion.

34. An assembly as claimed in claim 31, wherein said securing section has a wall thickness of from 0.1 to 0.3 mm.

35. An assembly as claimed in claim 31, wherein said securing section has a wall thickness of approximately 0.2 mm.

36. An assembly as claimed in claim 31, wherein said head of said guide sleeve is conically tapered to fit in a countersink in the opening in the first member.

37. An assembly as claimed in claim 36, wherein an angle of conical taper of said head is from 90° to 110°.

38. An assembly as claimed in claim 37, wherein said angle is approximately 100°.

39. An assembly as claimed in claim 36, wherein said head section of said closure pin in conically tapered and fits in a countersink in said head of said guide sleeve.

40. An assembly as claimed in claim 39, wherein an angle of conical taper of said head section is from 90° to 110°.

41. An assembly as claimed in claim 40, wherein said angle of conical taper of said head section is approximately 100°.

42. An assembly as claimed in claim 31, wherein said head section of said closure pin in conically tapered and fits in a countersink in said head of said guide sleeve.

43. An assembly as claimed in claim 42, wherein an angle of conical taper of said head section is from 90° to 110°.

44. An assembly as claimed in claim 43, wherein said angle of conical taper of said head section is approximately 100°.

45. An assembly as claimed in claim 31, wherein said stop comprises a locking ring positioned in an annular recess in said guide sleeve.

46. An assembly as claimed in claim 45, wherein said locking ring is prestressed radially inwardly, such that said locking ring grips said shaft section over an entire range of axial movement of said closure pin relative to said guide sleeve.

47. An assembly as claimed in claim 46, wherein said stop face comprises an annular face at an end of said shaft section spaced from said head section.

48. An assembly as claimed in claim 31, wherein said stop is positioned in a recess in said guide sleeve.

49. An assembly as claimed in claim 48, wherein said stop is biased radially inwardly, such that said stop grips said shaft section over an entire range of axial movement of said closure pin relative to said guide sleeve.

50. An assembly as claimed in claim 48, wherein said stop face comprises an annular face at an end of said shaft section spaced from said head section.

* * * * *